United States Patent [19]

Bucknell

[11] Patent Number: 5,730,569
[45] Date of Patent: Mar. 24, 1998

[54] HYDRAULICALLY ASSISTED FASTENER ELEMENT

[76] Inventor: John Wentworth Bucknell, 21 Jenkinson Street, Indooroopilly, Queensland, 4068, Australia

[21] Appl. No.: 813,103

[22] Filed: Mar. 7, 1997

Related U.S. Application Data

[63] Continuation of Ser. No. 403,804, filed as PCT/AU93/00477, Sep. 17, 1993 published as WO94/07042, Mar. 31, 1994, abandoned.

[30] Foreign Application Priority Data

Sep. 17, 1992 [AU] Australia ................. PL4777

[51] Int. Cl.⁶ ........................... F16B 37/08
[52] U.S. Cl. ................ 411/432; 411/434; 411/917; 411/254; 277/34
[58] Field of Search ................... 411/434, 432, 411/535, 917, 916, 302, 303, 294, 254; 277/34, 34.3, 193

[56] References Cited

U.S. PATENT DOCUMENTS

| | | | |
|---|---|---|---|
| 3,033,597 | 5/1962 | Miller | 411/917 |
| 3,154,006 | 10/1964 | Novak | 411/434 |
| 3,514,115 | 5/1970 | Gallo | 277/34.3 |
| 3,841,193 | 10/1974 | Ito | 411/916 |
| 3,860,271 | 1/1975 | Rodgers | 277/34 |
| 4,326,826 | 4/1982 | Bunyan | 411/339 |
| 4,854,798 | 8/1989 | Snyder | 411/434 |
| 5,468,106 | 11/1995 | Percival-Smith | 411/434 |

FOREIGN PATENT DOCUMENTS

| | | | |
|---|---|---|---|
| 2455788 | 8/1976 | Germany | 411/434 |
| 991783 | 5/1965 | United Kingdom . | |

*Primary Examiner*—Flemming Saether
*Attorney, Agent, or Firm*—Dennis H. Lambert

[57] ABSTRACT

An hydraulically assisted fastener has a pressure means (13) nested in a recess (15) or groove in a nut (11) or a thrust washer with a filler neck (20, 31, 44) whereat a nipple (14) can be used as a means of pumping grease or oil to the pressure means. The pressure means can be a bladder (13) or two parts with mated channels (42, 43). Alternately the pressure means (13) can be a single part with open channel (45) nested in a channel (46) in a nut body or thrust washer.

24 Claims, 6 Drawing Sheets

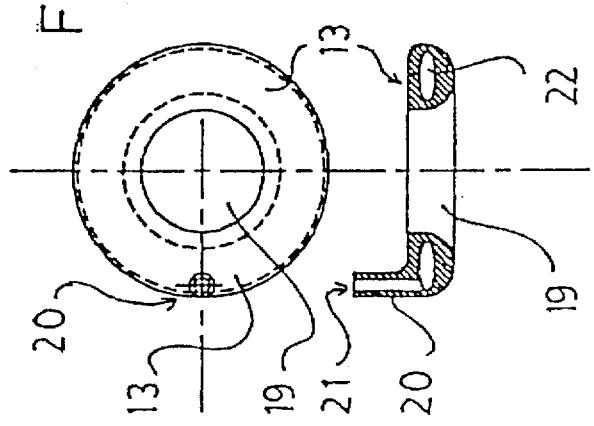
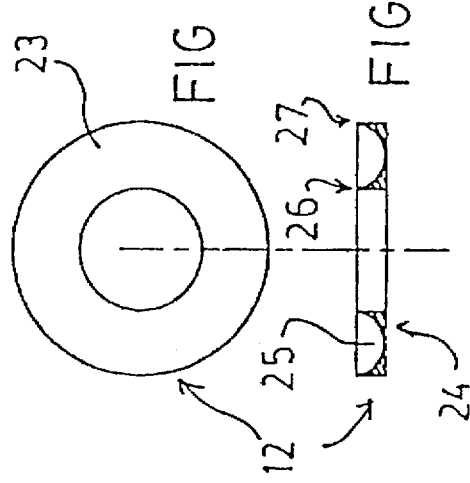
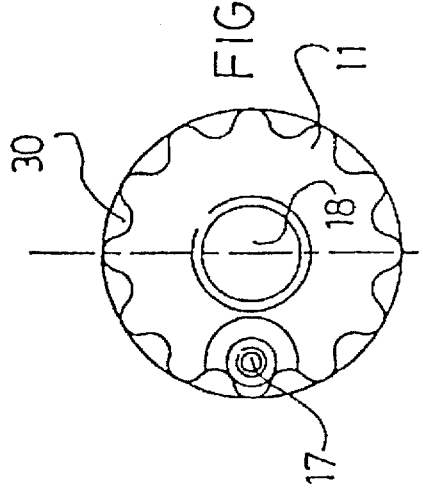
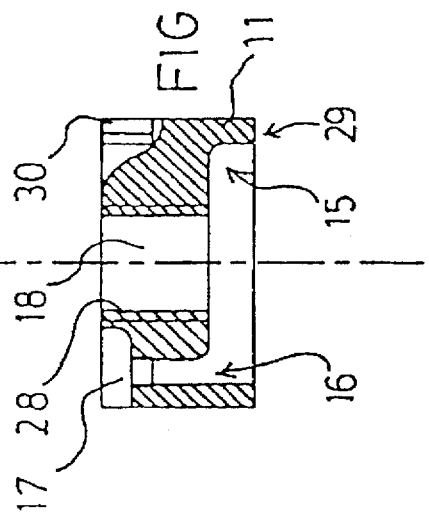
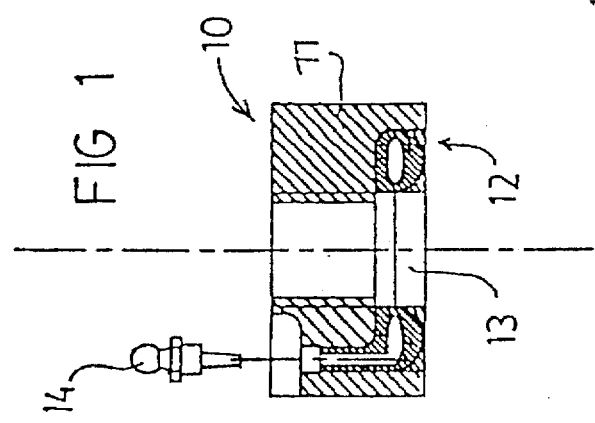

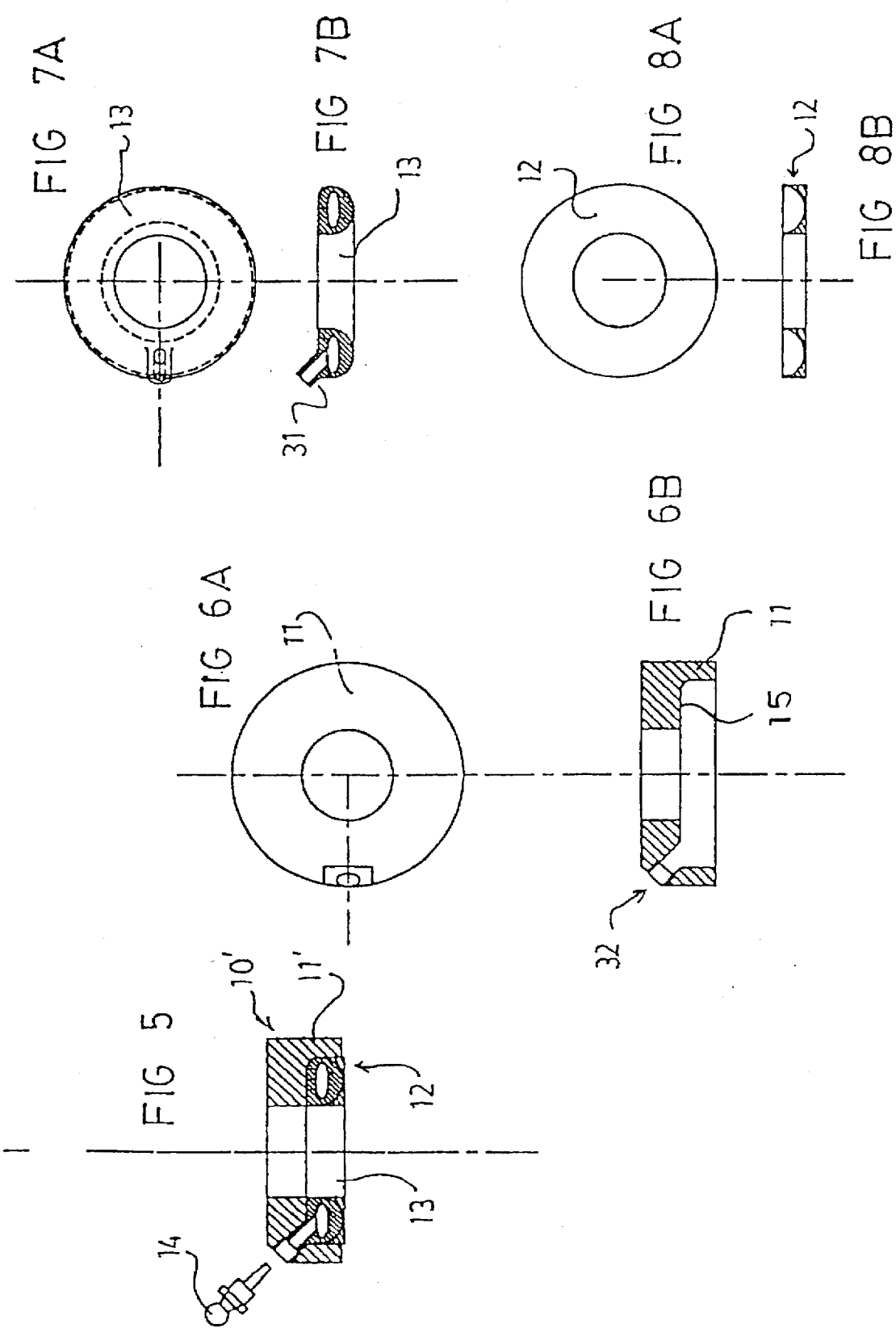

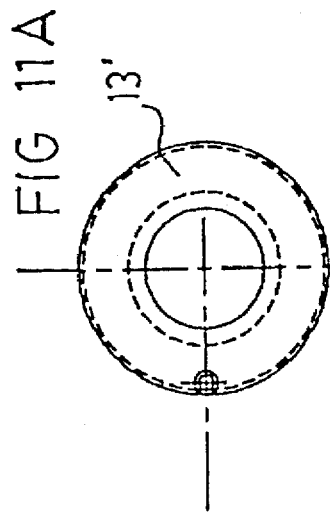
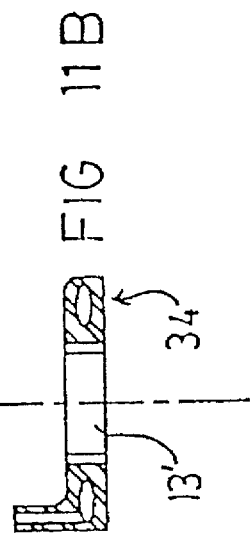
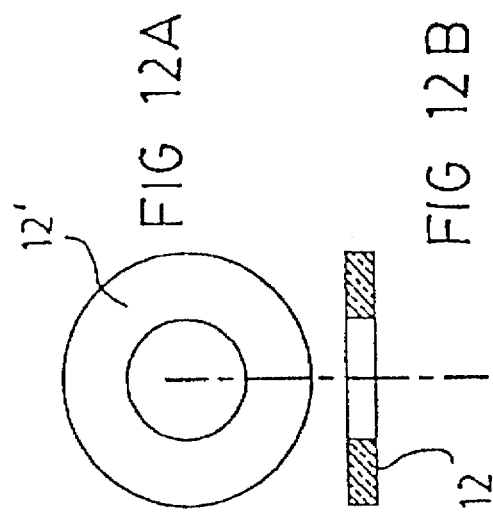
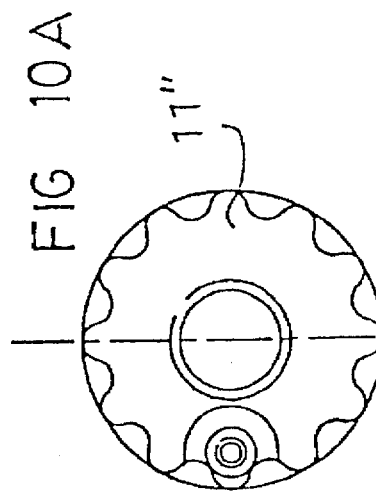
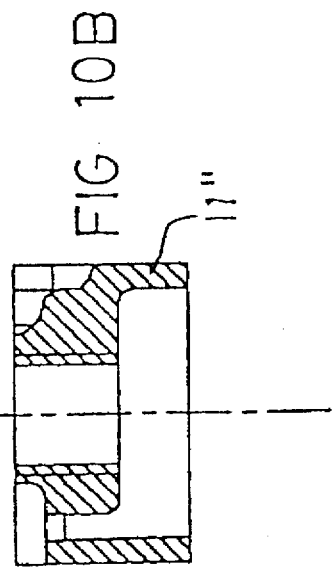
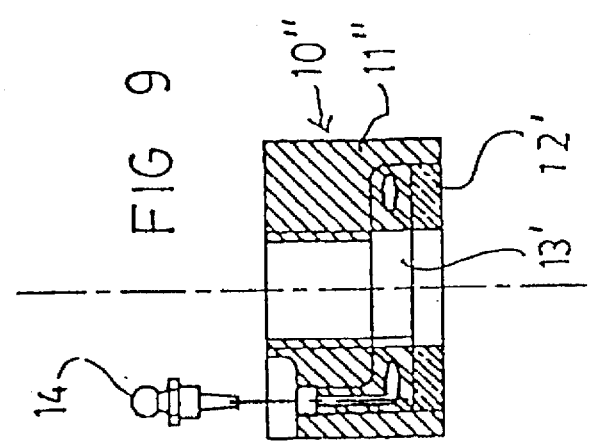

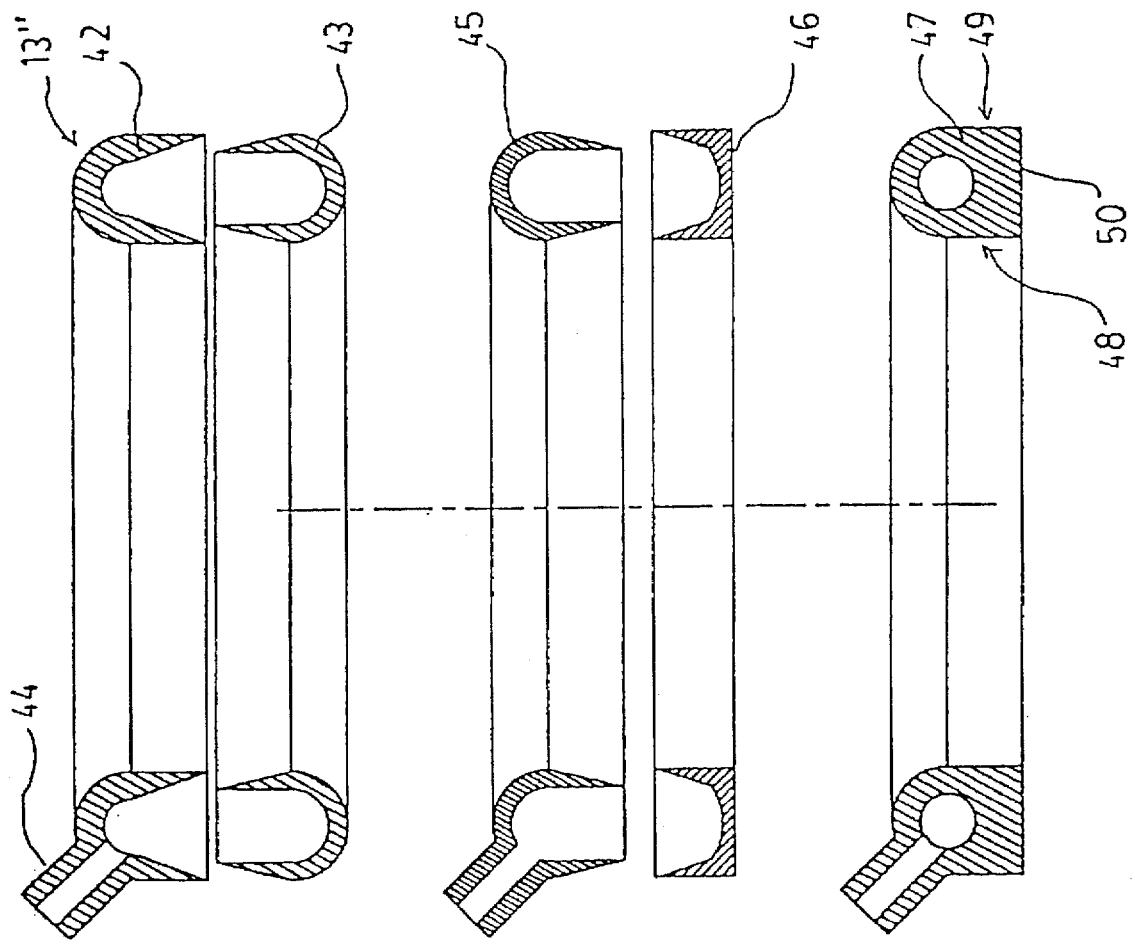

HYDRAULICALLY ASSISTED FASTENER ELEMENT

CROSS REFERENCE TO RELATED APPLICATIONS

This application is a continuation of application Ser. No. 08/403,804, filed May 2, 1995 now abandoned, which in turn claims the benefit under 35 USC 371 of PCT/AU93/00477, filed Sep. 17, 1993, which in turn claims the benefit under 35 USC 119 of Australian patent application number PL 4777, filed Sep. 17, 1992. This application claims priority of application PCT/AU93/00477, filed Sep. 17, 1993, published as International Application No. WO 94/07042 on Mar. 31, 1994, which in turn claims priority of Australian patent application Ser. No. PL 4777, filed Sep. 17, 1992.

BACKGROUND OF THE INVENTION

1. Field of the Invention

This invention relates to hydraulically assisted fasteners. More particularly, the invention relates to a hydraulically assisted fastener element for use in fastening systems wherein a connector element fastens one part to another. According to one form of the invention the fastener element comprises a threaded nut, and in another form it comprises a washer.

2. Description of the Prior Art

Materials handling equipment, as is used in the mining and like industries, is subject to extreme vibration and harsh operating conditions. The fasteners used in holding the components of this equipment together are required to hold against all stresses met in operation of the equipment. Various fasteners have been developed by which the components of materials handling equipment may be held together. It is known to provide hydraulically assisted nuts by which to clamp components together by means of the nut and a suitable bolt. In general, these nuts are complex structures requiring considerable effort in fabrication to raise costs.

SUMMARY OF THE INVENTION

It is an object of the invention to provide hydraulically assisted fasteners which achieve their object with a reduced inventory of componentry and at reduced costs.

This and other objects and advantages of the invention are achieved by an hydraulically assisted fastener element for association with a connector element passed through a part to be held by the connector element. The invention more specifically comprises a connector body for operative interaction with the connector element, wherein the connector body has an annular recess for receipt of an annular inflatable pressure means. Alternatively, the annular recess may be provided in a thrust washer associated with the connector body. The pressure means is mounted in the annular recess, and is expanded when hydraulic pressure is applied therein, to apply a force on the connector body, and thereby to the connector element, and to the surface of the part which the fastener element abuts.

The fastener element may comprise either a threaded nut for threaded attachment to the connector element, or it may comprise a washer having a bore therethrough for receiving the connector element.

The pressure means is preferably an annular hollow plastic or like part which is provided with an inlet at which an apparatus for delivering a hydraulic fluid such as grease or oil can be attached to enable the pressure means to be pressurised. The pressure means expands under pressure to fill out the space provided for it. The material of the pressure means can be chosen to have the ability to flow into the full volume provided for it.

BRIEF DESCRIPTION OF THE DRAWINGS

The invention will now be described with reference to various preferred embodiments as shown in the accompanying drawings, wherein:

FIG. 1 is a longitudinal sectional view of a first form of fastener element according to the invention, wherein the fastener element comprises a threaded nut;

FIG. 2A is a top plan view of the fastener element of FIG. 1;

FIG. 2B is a longitudinal sectional view of the fastener element of FIG. 1, with the upper right hand corner portion shown in elevation, and the inflatable pressure means removed for greater clarity in showing the recess;

FIG. 3A is top plan view of the inflatable pressure means used in the fastener element of FIG. 1;

FIG. 3B is a longitudinal sectional view of the inflatable pressure means of FIG. 3A;

FIG. 4A is a top plan view of a thrust washer as used in the fastener element of FIG. 1;

FIG. 4B is a longitudinal sectional view of the washer of FIG. 4A;

FIG. 5 is a longitudinal sectional view of a modified fastener element according to the invention, wherein the fastener element comprises a washer;

FIG. 6A is a top plan view of the fastener element of FIG. 5;

FIG. 6B is a longitudinal sectional view of the fastener element of FIG. 5, with the inflatable pressure means removed for clarity in illustrating the recess:

FIG. 7A is a top plan view of the inflatable pressure means as used in the fastener element of FIG. 5;

FIG. 7B is a longitudinal sectional view of the inflatable pressure means of FIG. 7A;

FIG. 8A is a top plan view of the thrust washer used in the fastener element of FIG. 5;

FIG. 8B is a transverse sectional view of the thrust washer of FIG. 8A;

FIG. 9 is a longitudinal sectional view of a modified fastener element according to the invention, wherein the element comprises a threaded nut, and the thrust washer and inflatable pressure means have contiguous flat, annular surfaces;

FIG. 10A is a top plan view of the fastener element of FIG. 9;

FIG. 10B is a longitudinal sectional view of the element of FIG. 9, with an upper right hand corner portion shown in elevation, and with the inflatable pressure means removed for clarity in illustrating the recess;

FIG. 11A is a top plan view of the inflatable pressure means used in the fastener element of FIG. 9;

FIG. 11B is a longitudinal sectional view of the inflatable pressure means of FIG. 11A;

FIG. 12A is a top plan view of the thrust washer used in the fastener element of FIG. 9;

FIG. 12B is a longitudinal sectional view of the washer of FIG. 12A;

FIG. 15 is an enlarged, exploded sectional view of a modified inflatable pressure means for use in the fastener element of the invention, wherein the inflatable pressure means comprises two mating halves;

FIG. 16 is an enlarged, exploded sectional view of a further modified inflatable pressure means according to the invention, wherein the inflatable pressure means comprises an annular chamber open on one side for cooperation with a complementally configured thrust washer to define an enclosed annular space;

FIG. 17 is an enlarged sectional view of a still further modified inflatable pressure means for use in the fastener dement of the invention.

DETAILED DESCRIPTION OF THE PREFERRED EMBODIMENTS

Figure 13:
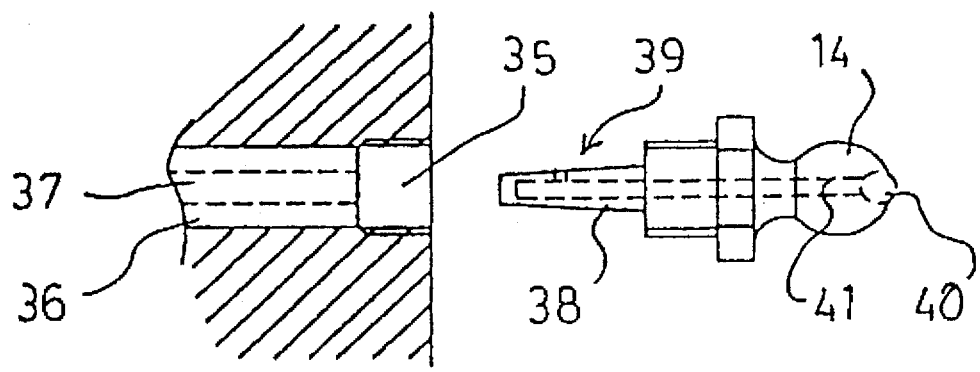
FIG. 13 is a fragmentary exploded view, with portions shown in section, of a nipple which may be used to inflate the inflatable pressure means of the previously described embodiments.

FIG. 1 is a section through a hydraulically assisted fastener 10 comprised of a connector body 11 or shell, preferably configured as a nut able to be acted upon by a spanner, having, nested in an annular recess 15 therein, a pressure means, such as a bag, bladder, cell 13, or the like or other channel means as described below, above a thrust washer 12. While the bladder is shown to be nested in a recess which is open to the bore in the nut body it will be clear that it could be loaded into a groove or channel in the nut body so as to not have the pressure means contacting a bolt shaft passed through the bore in the recess system, the pressure means engages with the bolt to assist in resisting torsion. The thrust washer is a preferred feature in this embodiment, but the fastener can be made to operate without it. A nipple 14 provides a means whereby a pressurised fluid might be pumped into the pressure means 13. Alternate means for delivering the pressure fluid will suggest themselves to those skilled in the art. As will become clear below, the geometry of the pressure cell, and the thrust washer, may be varied. The hydraulic fastener may be operated without use of the thrust washer or the thrust washer can be the element which is recessed to hold the pressure means.

FIGS. 2A and 2B show the body part or shell 11 from above and in vertical section, respectively. The connector body 11 has a recess 15 cut in the base about bore 18 with a passage 16 to shoulder 17 whereat a nipple (not shown) or the like can be attached to communicate with a pressure means nested in the recess 15.

FIGS. 3A and 3B show a pressure means, bag, bladder or cell from above and in vertical section, respectively. The cell 13 has a central hole 19 co-axial with the bore 18 of the body part 11 and a neck 20 with opening 21 therein into internal space 22. The neck 20 extends, in use, into passage 16 of the body part 11 so that a nipple 14 (of FIG. 1) may be inserted into the neck 20 when fitted in passage 16.

FIGS. 4A and 4B show the configuration of a thrust washer 12 from above and in section, respectively. The thrust washer 12 is a complementary annulus, co-axial, in use, with bore 18 of connector body 11 with its upper surface 23 cut concave into the body 24 of the thrust washer 12 to produce a concavity 25 between upstanding lips 26 and 27. In use the cell 13 nests into recess 15 and concavity 25 and their respective shapes are preferably complementary.

In use of the above hydraulically assisted fastener, the connector body is applied to a bolt or other like connector means with a thread engaged in a complementary thread in the bore 18 in the sidewalls 28 (see FIG. 2B) with the connector body screwed down so that its lower surface butts against a surface to be clamped by the fastener or a thrust washer therebetween. The scalloped head 30 (see FIGS. 2A and 2B) provides the means by which the body part might be engaged by a suitable tool (not shown), turned and mechanically tensioned. Clearly a variety of other geometries would suit this purpose. At this point, a pressurised fluid might be injected into the cell 13 to push against the surface to be clamped, or the thrust washer 12 against the surface to be clamped, with greater force. In this embodiment, the pressure means or cell expands against the thrust washer and the shaft of the connector element or bolt which the fastener acts on. It would be possible to make the annular recess as an annular groove (with walls on both sides) so that the pressure means or cell is isolated from the connector element.

FIGS. 5 to 8 show a different form of hydraulically assisted fastener. In this embodiment, the hydraulic element comprises a washer 10' to be used with, say a nut and bolt, as described above. This time the body part 11' serves as a washer, with a separate nut (not shown) providing the means to engage a bolt (not shown) and generate an hydraulic pressure. In this embodiment, the nipple 14 enters from the side of the washer and the neck 31 enters the washer at an oblique passage 32. Otherwise this embodiment is the same as the above described embodiment and it functions as the above nut does.

FIGS. 9 to 12 show another embodiment. The difference here is that the flat washer 12' has no concavity and the cell 13' is provided with a flat base 34. The body part 11" may be either a threaded nut as in FIG. 1 or a washer as in FIG. 5.

FIG. 13 shows a nipple 14 prior to insertion into passage 35 and the opening 37 of the neck 36 of a cell (not shown).

Figure 14:
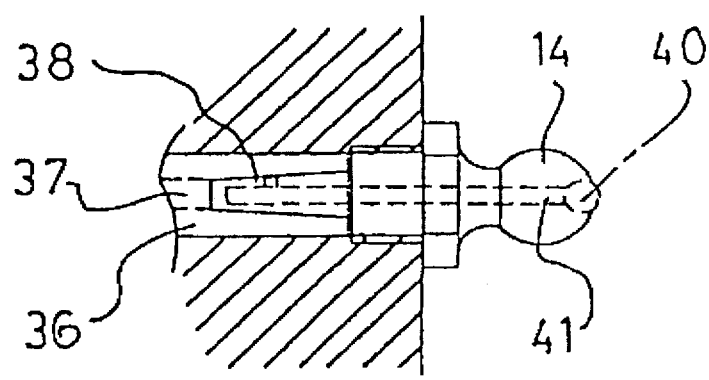
FIG. 14 is a fragmentary sectional view showing the nipple of FIG. 13 inserted into the its receptacle.

FIG. 14 shows the same nipple in place. The neck 36 encompasses the shaft 38 of the nipple 14 to envelope hole 39 to passage 41 of nipple 14. The neck sleeved over the nipple shaft 38 provides a seal in addition to the usual ball 40 in passage 41. The nipple may be screwed into the bore therefor.

FIGS. 15 to 17 show various and different means whereby the pressure means or cell of the above embodiments might be realised.

In FIG. 15, the pressure means or cell 13" is a two-part construction with upper-part 42 and lower-part 43, preferably plastic components, nested together so as to create a space into which a pressurised fluid might be pumped, the two parts being held between the body part and thrust washer as before with neck 44 for application of a nipple (not shown). Under pressure, the initially separate parts will come together and act as a unit with their separate parts effectively welded to provide a sealed cavity into which pressurised fluid can be pumped, to squeeze the material of the parts into the volume they are fitted to, to cause pressure on the thrust washer or surface to be clamped in the same manner, as does a single piece pressure means or cell. Structures of this kind may be nested in a channel or groove to be supported at both sides in a nut body or within a thrust washer.

In FIG. 16, a one part open pressure means 45 nests inside a thrust washer 46 and the two parts create a cavity therebetween for pressurised fluid. On assembly, the lips of the pressure means 45 will be curved about and sealed to the inner face of the pressure washer to enclose a space therebetween.

In FIG. 17 is seen a pressure means 47 with respective sides 48 and 49, and a base surface 50 which engage with a central bolt, connector body cavity, and surface to be clamped, respectively.

Figure 18:
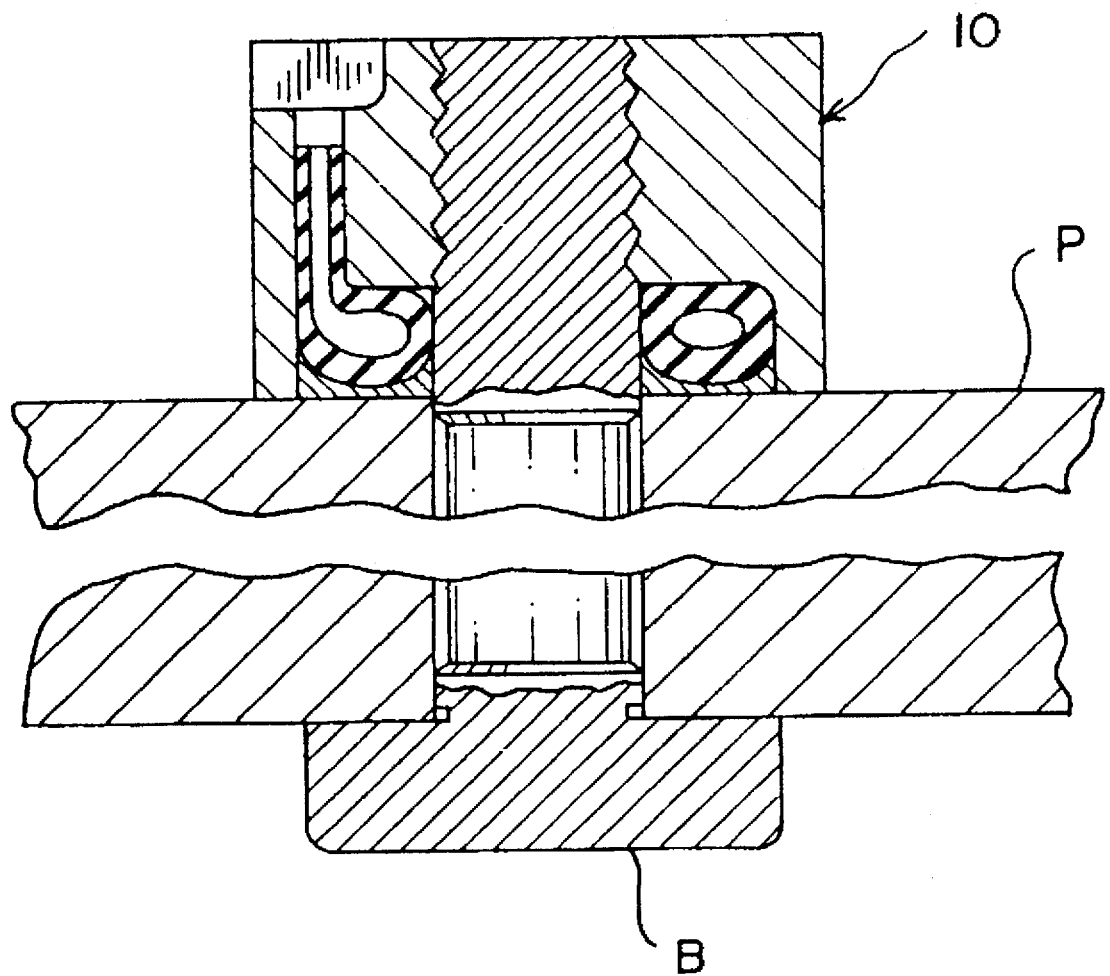
FIG. 18 is an enlarged longitudinal sectional view, with portions broken away, illustrating the manner of use of the fastener element of the invention with a connector element and a part to be secured.

FIG. 18 shows a typical arrangement using the hydraulically assisted fastener element 10 of FIG. 1 in combination with a connector element, such as a bolt B, passed through a part P to be held by the fastener element when attached to the connector element, similar to that shown in European patent application number 0 129 440, for example.

The above described hydraulically assisted fasteners are designed to be an inexpensive means of applying high tensile loads to members such as bolts. The fasteners might be made in two but more usually three structural pieces. The connector body or outer shell is ideally formed by forging from steel. These casings can be made with a smooth bore to act as a washer or with a thread to act as a nut. The pressure cell can be a polyurethane tire with an inner cavity to allow insertion, under pressure, of an oil or grease. A thrust washer is ideally forged or pressed from a flowable metal such as brass or aluminium. The hydraulic fitting is to suit a grease gun or similar means to inject grease or oil under pressure. When screwed into place it can form a non-return sleeve to retain the internal pressure. The pumping means can be any common or suitable pumping apparatus, or a direct displacement method such as a threaded forcing screw in a sealed cavity.

When pressurising media is introduced through the nipple, the polymeric insert itself behaves as a fluid to force the thrust washer against the face of the joint. The area of the annulus is calculated to be that which under a specific pressure will apply a predetermined force to the joint and the tensile member. As the pressure increases during a charging operation, the expanding polymer will crush any thin edge of the thrust washer against their abutting surfaces, eliminating any gap through which material might extrude. This action, and that of the polymer forcing against the walls of the body part and the shaft of a bolt, etc, provides a strong grip to resist the effects of vibration and the like. To check the force in the joint at any time in service, the specified pressure is applied. To remove the fastener, the nipple is removed, and the nut/washer is then removed in the normal manner.

In production of the above, the flat faced thrust washer requires greater attention to tolerances and surface finish of components than does the concave version. In a two part pressure cell, in operation, the two polymeric parts will be deformed into each other to create a sealed cavity, as will the single upper polymeric part being deformed into the concavity of a thrust washer. The versions which are to operate without thrust washers will be suitable for applications requiring lesser clamping forces and/or internal charge pressures.

In the above described devices there is a novel assembly of elements; a novel use of deformable thrust washer; a novel gripping action of the polymer insert; a novel inner cell; a novel means for achieving a pressure cavity; and a novel inlet valve. It will be clear to those skilled in the art that many variations of shape, dimension, and number of combined parts can be made within the scope of the invention herein, as set forth in the following claims.

The material for the pressure means may be a polyurethane or suitable grade polymeric material moulded to the required shape. A recessed nut system is a means to reduce inventory over a recessed thrust washer system as the thrust washer can otherwise be eliminated. The nipple of FIGS. 13 and 14 can be off-the-shelf nipples mounted to a transition piece screwed into the nut body. Generally a single piece bladder is preferred as improved sealing exists with this system.

I claim:

1. An hydraulically assisted fastener comprising:
    a connector body with a threaded bore therein;
    said connector body having an annular recess coaxial with said bore and adjoined thereto, said recess opening both axially outwardly of an end surface and radially inwardly to said bore;
    an annular inflatable pressure means in said recess, said pressure means having an inlet means through which fluid under pressure may be injected into the inflatable pressure means to expand the pressure means axially and radially with respect to said recess and said bore; and
    a thrust washer located in the recess against the annular pressure means, with the annular pressure means received between the connector body and the thrust washer.

2. An hydraulically assisted fastener as claimed in claim 1, wherein:
    the thrust washer has a concave surface facing the annular pressure means and it is deformable under pressure.

3. An hydraulically assisted fastener as claimed in claim 2, wherein:
    the annular pressure means comprises opposed annular parts provided with adjoining channels thereabout, the channelled parts being mated one within the other to enclose an internal volume.

4. An hydraulically assisted fastener as claimed in claim 3, wherein:
    the annular pressure means is a bladder nested in said recess, and the neck comprises a filler neck extending from the bladder and passed through said bore.

5. An hydraulically assisted fastener as claimed in claim 2, wherein:
    tile annular pressure means is an annular part with a channel thereabout, which part is deformable to sealably interengage within the concave surface of the thrust washer.

6. An hydraulically assisted fastener as claimed in claim 2, wherein:
    the annular pressure means is a polymeric bladder and the thrust washer is a metal such as brass.

7. An hydraulically assisted fastener as claimed in claim 1, wherein:
    the pressure means is an annular bladder with an elongate neck passed through a bore in the connector body.

8. An hydraulically assisted fastener as claimed in claim 1, wherein:
    the annular pressure means comprises opposed annular parts provided with adjoining channels thereabout, the channelled parts being mated one within the other to enclose an internal volume.

9. An hydraulically assisted fastener as claimed in claim 8, wherein:
    one said annular part is provided with a tubular neck whereat a valve is fitted whereby the annular pressure means may be pressurized.

10. An hydraulically assisted fastener as claimed in claim 9, wherein:
    said one annular part is a polymeric material nested into a channel of a thrust washer formed of a metal such as brass.

11. An hydraulically assisted fastener as claimed in claim 1, wherein:

the connector body is formed with a bore therein leading to the recess, and the means through which fluid may be injected includes an elongate neck extended in said bore.

12. An hydraulically assisted fastener as claimed in claim 11, wherein:

said neck to the bladder is open-ended, and a nipple for feeding pressurized fluid is inserted therein and mounted in said bore.

13. An hydraulically assisted fastener as claimed in claim 1, wherein:

the annular pressure means is an annular bladder having a tubular neck attached thereto for interaction with a valve whereby the bladder can be pressurized.

14. An hydraulically assisted fastener as claimed in claim 1, wherein:

the pressure means comprised a bladder having a flat face oriented axially outwardly of the recess.

15. An hydraulically assisted fastener element for use in a fastening system to hold one part to another part, wherein said fastening system includes an elongate connector element adapted to be extended through one of said parts and secured under axial tension, comprising:

a connector body having opposite end surfaces and an axial bore therethrough for receiving said connector element;

one of said end surfaces having an annular recess therein encircling said bore and opening both axially outwardly of said end surface and radially inwardly to said bore; and an annular inflatable pressure means in said recess, with means for introduction of fluid under pressure into said pressure means to cause the pressure means to expand both axially and radially relative to said recess and to said bore, whereby when a connector element is received through said bore and the pressure means is inflated and expanded, the pressure means can apply an axial force on the connector body and thus on the connector element to axially tension the connector element, and also can apply a radial force between the connector element and the connector body to resist relative rotational movement between the connector body and the connector element.

16. An hydraulically assisted fastener element as claimed in claim 15, wherein:

the connector body comprises a threaded nut for threaded engagement with the connector element.

17. An hydraulically assisted fastener element as claimed in claim 16, wherein:

the connector element comprises an elongate bolt.

18. An hydraulically assisted fastener element as claimed in claim 15, wherein:

the connector body comprises a washer for cooperation with the connector element and an associated fastener.

19. An hydraulically assisted fastener element as claimed in claim 18, wherein:

the connector element comprises an elongate bolt.

20. An hydraulically assisted fastener element as claimed in claim 15, wherein:

the connector element comprises an elongate bolt.

21. An hydraulically assisted fastener as claimed in claim 15, wherein:

the annular pressure means comprises opposed annular parts provided with adjoining channels thereabout, the channelled parts being mated one within the other to enclose an internal volume.

22. An hydraulically assisted fastener for use in a fastener system to hold one part to another part with an elongate connector element extended through at least one of the parts and secured under tension, wherein said connector element comprises an elongate bolt having an externally threaded portion; said fastener comprising:

a connector body having opposite end surfaces and a threaded axial bore extended therethrough for receiving said externally threaded connector element;

said connector body having an annular recess co-axial with said bore and adjoined thereto, said recess opening both axially outwardly of one of said end surfaces and radially inwardly to said bore;

an annular inflatable pressure means in said recess, said pressure means having an inlet means through which fluid under pressure may be injected into the inflatable pressure means to expand the pressure means axially and radially with respect to said recess and said bore; and a deformable thrust washer located in said annular recess against said annular pressure means, with said annular pressure means received between the connector body and the thrust washer, said thrust washer being deformable under pressure to enter into and seal spaces in said fastener system, to thereby prevent extrusion of said inflatable pressure means into said spaces and thus prevent loss of pressure from the inflatable pressure means, enabling said hydraulically assisted fastener to be used with connector elements not having specially configured or machined surfaces.

23. An hydraulically assisted fastener comprising:

a connector body with a threaded bore therein;

said connector body having an annular recess coaxial with said bore and adjoined thereto; and an annular inflatable pressure means in said recess, said pressure means having an inlet means through which fluid under pressure may be injected into the inflatable pressure means to expand the pressure means axially and radially with respect to said recess and said bore, said pressure means comprising opposed annular parts provided with adjoining channels thereabout, the channelled parts mated one within the other to enclose an internal volume.

24. An hydraulically assisted fastener as claimed in claim 23, wherein:

one annular part is provided with a tubular neck to which a valve is attached, whereby the pressure means may be pressurized.

* * * * *